(12) United States Patent
Chen et al.

(10) Patent No.: US 8,477,117 B2
(45) Date of Patent: Jul. 2, 2013

(54) EMBEDDED OPTICAL INDUCTION INPUT DEVICE AND METHOD OF IMPLEMENTING THE SAME

(75) Inventors: Po-Yang Chen, Taipei (TW); Po-Sheng Shih, Taipei (TW)

(73) Assignee: Hannstar Display Corporation, Taipei (TW)

( * ) Notice: Subject to any disclaimer, the term of this patent is extended or adjusted under 35 U.S.C. 154(b) by 1176 days.

(21) Appl. No.: 12/370,708

(22) Filed: Feb. 13, 2009

(65) Prior Publication Data

US 2010/0066703 A1    Mar. 18, 2010

(30) Foreign Application Priority Data

Sep. 16, 2008   (TW) ................................ 97134573 A (51) Int. Cl.
*G06F 3/042*       (2006.01)
(52) U.S. Cl.
USPC ........... 345/175; 345/173; 345/104; 345/102; 178/18.01; 178/18.09; 178/19.01; 178/19.05
(58) Field of Classification Search
USPC . 345/173, 175, 87–102, 204, 104; 178/18.01, 178/18.03, 18.09, 19.01, 19.05; 463/37–38
See application file for complete search history.

(56) References Cited

U.S. PATENT DOCUMENTS

| | | | | |
|---|---|---|---|---|
| 7,586,479 B2* | 9/2009 | Park et al. | ...................... | 345/102 |
| 7,623,112 B2* | 11/2009 | Chen et al. | .................... | 345/104 |
| 7,709,868 B2* | 5/2010 | Pak et al. | ....................... | 257/290 |
| 7,889,183 B2* | 2/2011 | Lee et al. | ....................... | 345/173 |
| 7,999,796 B2* | 8/2011 | Lee et al. | ....................... | 345/174 |
| 2003/0205662 A1* | 11/2003 | Boer | .......................... | 250/208.1 |
| 2007/0290971 A1* | 12/2007 | Shih et al. | ....................... | 345/90 |
| 2007/0296660 A1* | 12/2007 | Kimura et al. | .................. | 345/87 |
| 2008/0180426 A1* | 7/2008 | Liu et al. | ........................ | 345/207 |
| 2008/0198140 A1* | 8/2008 | Kinoshita et al. | ............. | 345/173 |
| 2010/0265220 A1* | 10/2010 | Shih et al. | ..................... | 345/204 |
| 2010/0283948 A1* | 11/2010 | Chen et al. | .................... | 349/116 |
| 2011/0075059 A1* | 3/2011 | Shih et al. | ....................... | 349/12 |

* cited by examiner

*Primary Examiner* — Lun-Yi Lao
*Assistant Examiner* — Priyank Shah
(74) *Attorney, Agent, or Firm* — Ming Chow; Sinorica, LLC (57) ABSTRACT

An embedded optical induction input device and method of implementing the same. Such a device includes a light sensing circuit and a conversion circuit. The light sensing circuit generates an induced current signal based on the variations of the intensity of light irradiation received as caused by a touch-control-position event; and the conversion circuit is connected to the light sensing circuit and receives an induced current derived therefrom. The conversion circuit is provided with a first transistor and a second transistor coupled together, that are driven by a positive and a negative biases having the same period but different phases, thus the induced current signals are converted into induced voltage signals based on the alternative turn-on's and turn-off's of the first transistor and the second transistor.

17 Claims, 7 Drawing Sheets

EMBEDDED OPTICAL INDUCTION INPUT DEVICE AND METHOD OF IMPLEMENTING THE SAME

BACKGROUND OF THE INVENTION

1. Field of the Invention

The present invention relates to a touch-control display technology, and in particular to an embedded optical induction input device and an embedded optical induction input method.

2. The Prior Arts

Nowadays, touch-control panels are the most simple, direct, and efficient means of communications between users and electronics devices, thus, they have become very popular and are widely utilized. As such, touch-control panels operated under various operation principles are developed and commercialized. Among them, the most commonly used touch-control panels include: capacitor type, resistor type, sonic wave type, infrared light type, and in-cell (embedded) type touch-control panels, etc. Wherein, the development of in-cell (embedded) touch-control panels is getting most of the attentions. Compared with the conventional resistor or capacitor type touch-control panels both requiring additional touch-control panels to be installed on the associated display panels, for an in-cell (embedded) touch-control panel, the touch-control function is built-in and incorporated into a display panel without additional touch-control panels. Therefore, it has the advantages of light-weight, small size, and high optical performance, and thus is held in high esteem in the industry.

Figure 1:
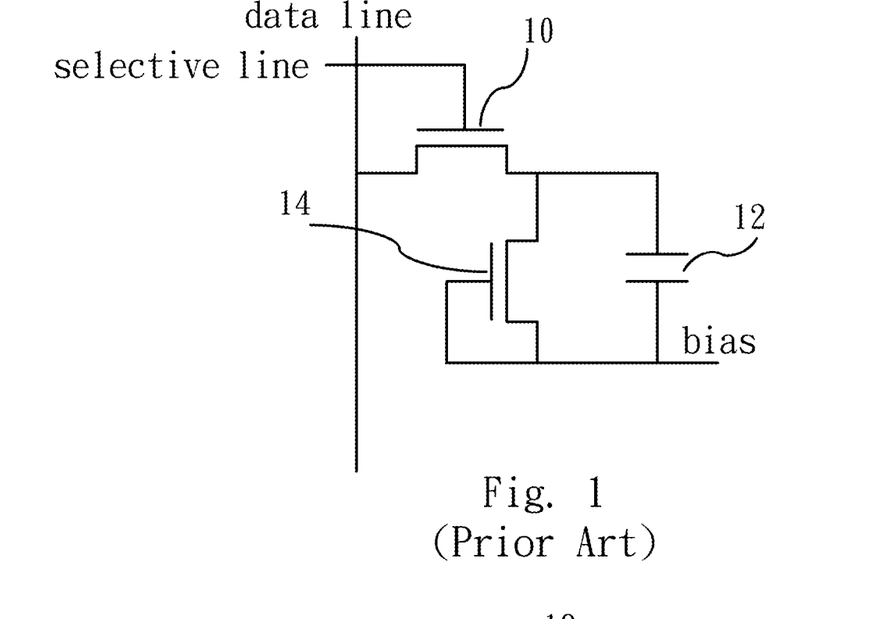
FIG. 1 is a circuit diagram of a charge type light sensing circuit according to the prior art.
Figure 2:
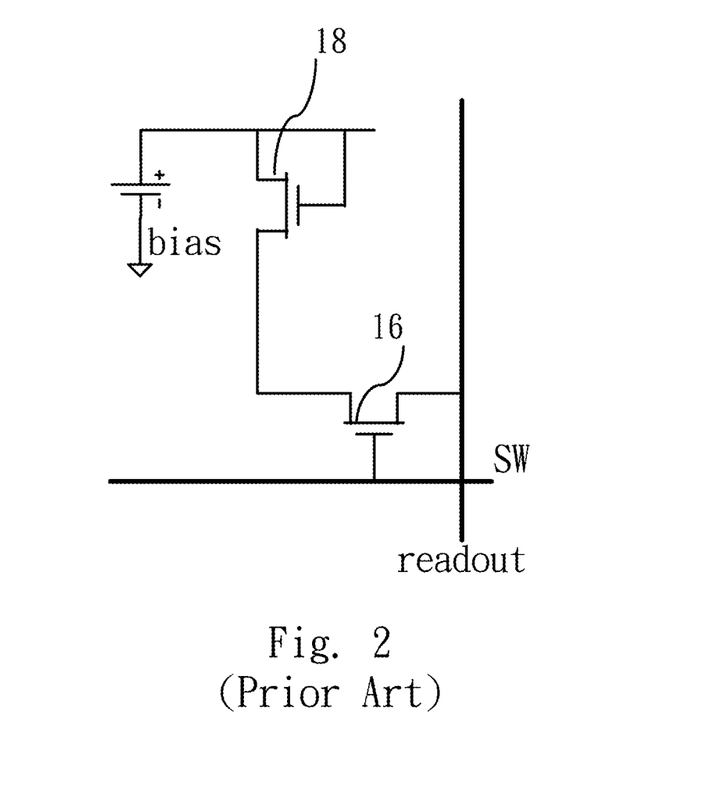
FIG. 2 is a circuit diagram of a current type light sensing circuit according to the prior art.

Presently, most of the in-cell (embedded) touch-control panels are of an optical sensor type, wherein, a photo sensor embedded in a display panel is used to detect the light intensity distribution on a panel in determining a touch-control-position event, and in such a process, the photo sensitivity amorphous silicon material is utilized, while such photo sensors can be the amorphous silicon thin-film-transistor (a-Si TFT) sensors produced directly by utilizing the existing manufacturing process and equipment. Moreover, according to the different light sensing principles, the light sensing circuit can be classified into a charge mode and a current mode. As shown in FIG. 1, while in a charge mode, a first transistor 10 is turned on, thus charging a storage capacitor (Cst) 12, next, the first transistor 10 is turned off, and then a part of the charges in the storage capacitor 12 will be leaked out due to a photo current flowing through a second transistor 14. As the light intensity is getting stronger, the charge leakage is getting faster because the photocurrent is proportional to the light intensity. Afterwards, the first transistor 10 is turned on again to read the charges remaining in the storage capacitor 12 in determining a touch-control-position event. Furthermore, as shown in FIG. 2, while in a current mode, a switching transistor 16 is turned on, so that current will flow into a detector transistor 18, the magnitude of current flowing through detector transistor 18 is dependent on the intensity of light exposing on the detector, thus the magnitude of a current is read directly in determining a touch-control-position event.

Figure 3:
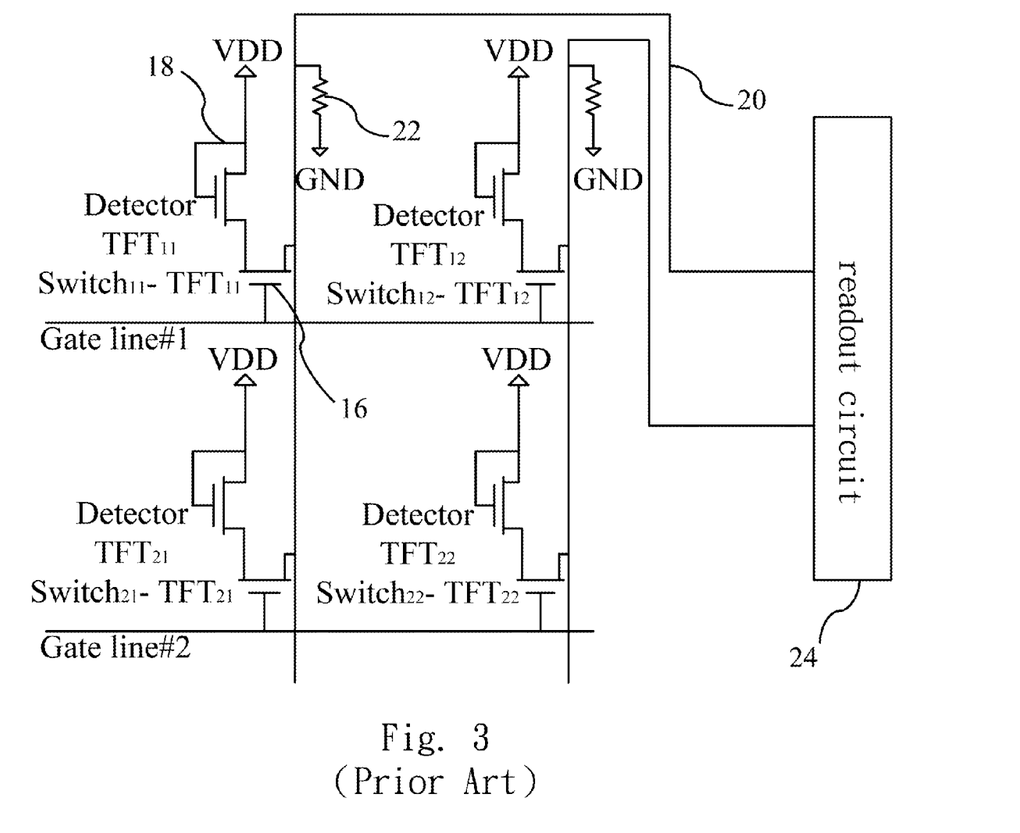
FIG. 3 is a circuit of a light sensing circuit utilizing a resistor in converting induced current signals into induced voltage signals according to the prior art.

For the light sensing circuit in a current mode, since the outputs of this circuit are signals of a light induction current, however, for the circuits responsible for system processing, the signals utilized are predominantly voltage signals, thus each of the respective read line 20 is connected to a resistor 22, as shown in FIG. 3, so that the output light induction current signals are converted into light induction voltage signals, and then that are transferred to a read circuit 24 via a read line 20 in determining the occurrence of a touch-control-position event. However, in this respect, in general, a large quantity of resistors have to be added additionally onto a printed-circuit-board (PCB), and that is quite inefficient, besides, the cost is high.

In view of the problems and shortcomings of the prior art, the present invention provides an embedded optical induction input device and a method implementing the same, so as to solve the afore-mentioned problems of the prior art.

SUMMARY OF THE INVENTION

The major objective of the present invention is to provide an embedded optical induction input device and a method of implementing the same. In the application of the present invention, transistors are utilized to replace the original resistors, hereby achieving the purpose of converting induced current signals into induced voltage signals; meanwhile, the transistors utilized can be produced concurrently by making use of the existing manufacturing processes and equipment of semiconductor arrays, thus being able to be embedded and incorporated into a display device.

The another object of the present invention is to provide an embedded optical induction input device and a method of implementing the same. Since an embedded optical induction input device can be produced in a standardized manufacturing process and equipment without having to add touch-control panel and additional resistors, therefore, its cost can be reduced to the minimum, the modularized product thus produced can be relatively thin and light-weight, thus achieving wider scope of applications.

According to one aspect of the present invention, an embedded optical induction input device is provided, including a plurality of regularly arranged induction input units used in sensing touch-control-position events, with each of the respective induction input units comprising at least a or a plurality of light sensing circuits and a conversion circuit. Wherein, the light sensing circuit is used to generate an induced current signal according to the variations of the intensity of light irradiation received caused by a touch-control-position event; and the conversion circuit is connected to the light sensing circuit and having a first transistor and a second transistor connected together, thus that are turned on and turned off alternatively in converting induced current signals into induced voltage signals.

According to another aspect of the present invention, an embedded optical induction input method implementing the above-mentioned embedded optical induction input device is provided, including the following steps: firstly, applying a high level voltage and a low level voltage respectively on the gates of the above-mentioned first transistor and second transistor, hereby turning on the first transistor and turning off the second transistor, thus utilizing the first transistor in converting induced current signals produced by a light sensing circuit into induced voltage signals as an output; subsequently, applying a low level voltage and a high level voltage on the gates of the first transistor and second transistor respectively, hereby turning off the first transistor and turning on the second transistor, thus utilizing the second transistor in converting induced current signals into induced voltage signals as an output; and finally, repeating the above-mentioned steps, so that the first transistor and the second transistor convert alternatively the induced current signals into the induced voltage signals, thus proceeding continuously with sensing the occurrences of touch-control-position events by making use of the polarity variation of the two transistors.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

In the application of the present invention, transistors are used to replace the conventional resistors in performing the same functions. However, in case that a single transistor is utilized, there still exists the problem of charge trapping, thus causing the shifting of threshold voltage (Vt) of a transistor, and resulting in the instability of the output signals, hereby creating reliability problems. As such, in the present invention, AC is used for driving, and voltages of different polarities are provided alternatively to the gates, drains and sources of two transistors respectively, thus keeping the trapped charges balanced, and solving the Vt shifting problems. As such, achieving effective compensation of Vt shifting through driving transistors with AC.

Figure 4:
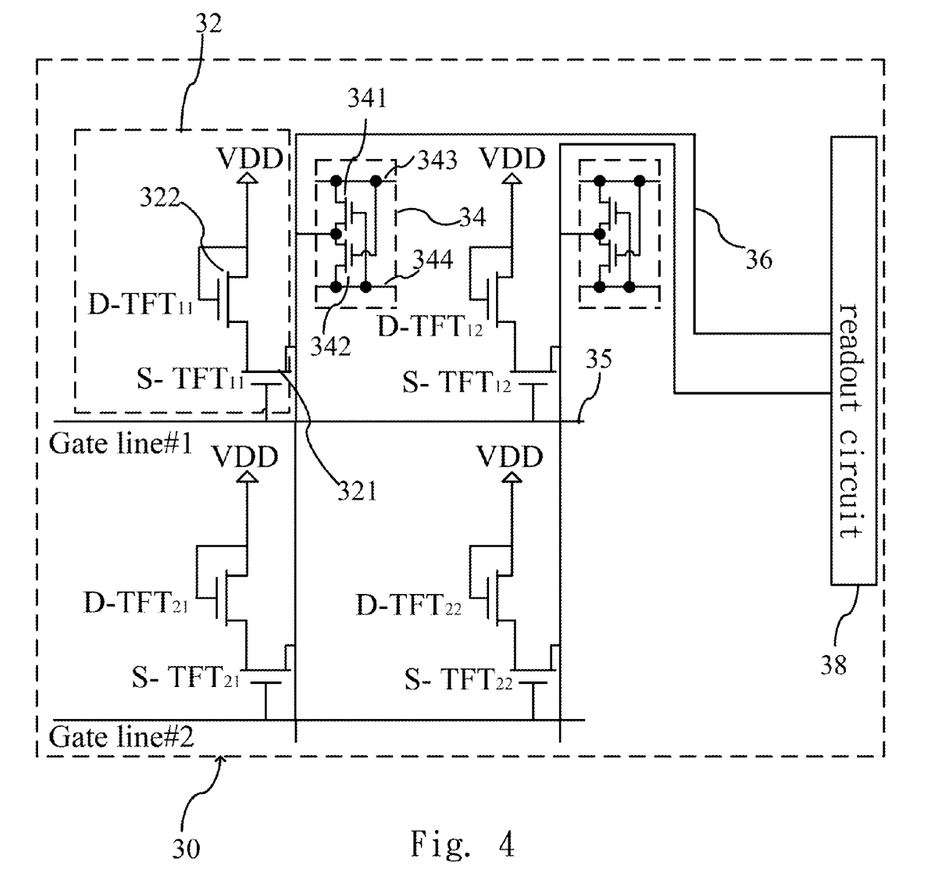
FIG. 4 is a circuit diagram of an optical induction input device according to a first embodiment of the present invention.
Figure 5:
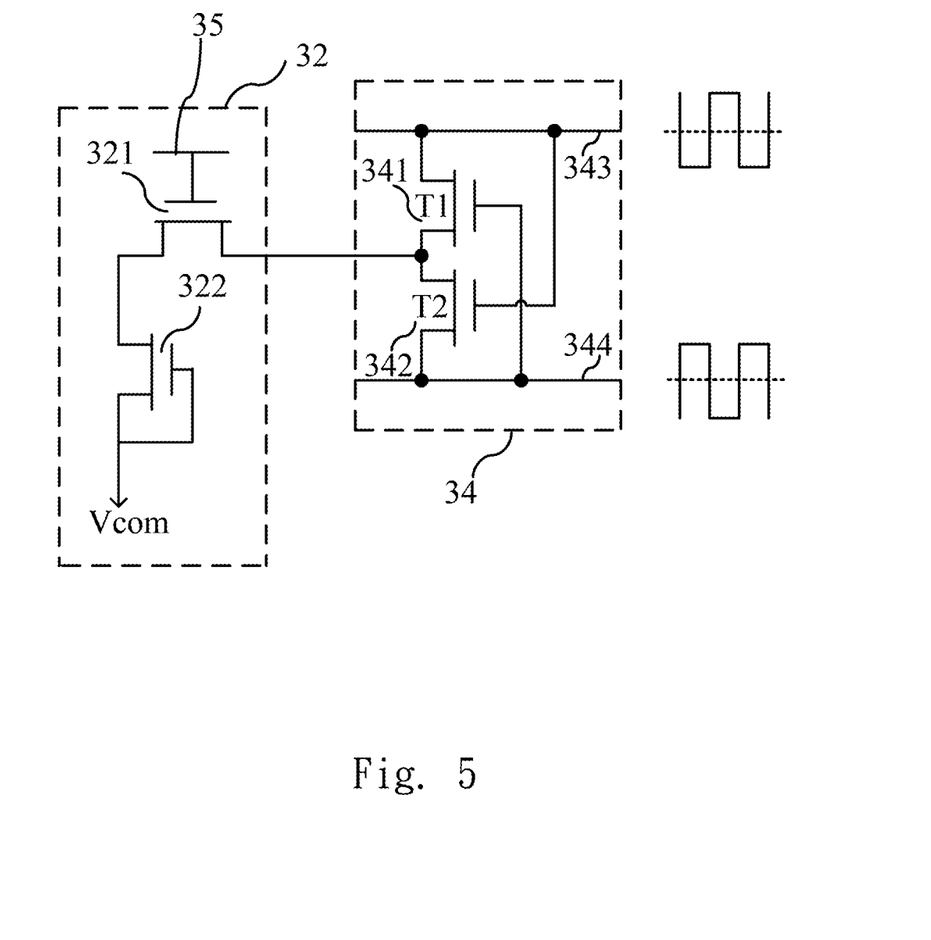
FIG. 5 is an enlarged view of a portion of the circuit as shown in FIG. 4.

Referring to FIGS. 4 and 5 for an embedded optical induction input device 30 according to a first embodiment of the present invention, including a plurality of light sensing circuits 32 arranged in an array, that are disposed on the corresponding liquid crystal device. In a first embodiment of the present invention, a conversion circuit 34 and a plurality of light sensing circuits 32 operated in its cooperation are referred to as a induction input unit. Naturally, no matter the quantity or constructions of the light sensing circuits 32, they can work well with the conversion circuit 34 of the present invention. As shown in FIGS. 4 & 5, each of the respective light sensing circuits 32 includes a switching transistor 321 and a detector transistor 322. This switching transistor 321 controls the current flowing into the detector transistor 322 based on the signals received from a gate line 35, so that the detector transistor 322 may generate an induced current signal based on its intensity of light exposing on the detector. The conversion circuit 34 includes a first transistor (T1) 341 and a second transistor (T2) 342 coupled to each other. The first transistor (T1) 341 and the second transistor (T2) 342 are connected to the light sensing circuit 32, and are used to convert alternatively the induced current signals into the induced voltage signals, and then transfer the induced voltage signals to a read circuit 38 through a read line 36 in determining a touch-control position event as based on the location that generates the induced current signals. In the above configuration, the switching transistor 321, the detector transistor 322, the first transistor 341, and the second transistor 342 are all thin film transistors.

More specifically, in a conversion circuit 34, a gate of a second transistor 342 is connected to a first bias line 343, with its drain connected to a second bias line 344; a source of a second transistor 342 is connected to a source of a first transistor 341, thus being able to receive the above-mentioned induced current signals, and both the sources of a first transistor 341 and the second transistor 342 are connected respectively to a light sensing circuit 32. A gate of a first transistor 341 is connected to a second bias line 344, with its drain connected to the first bias line 343, so as to supply voltage signals of the same period but opposite phases respectively to a second transistor 342 and a first transistor 341 through a first bias line 343 and a second bias line 344. Since both the first transistor 341 and the second transistor 342 can be considered having the function of a resistor respectively, thus they are used to convert current signals induced by the light sensing circuit 32 into voltage signals. In addition, since the two transistors 341 and 342 are biased with two square waves of opposite phases, so that the voltages of the two transistors 341 and 342 may change their polarities with time, thus balancing the trapped charges.

Figure 6A:
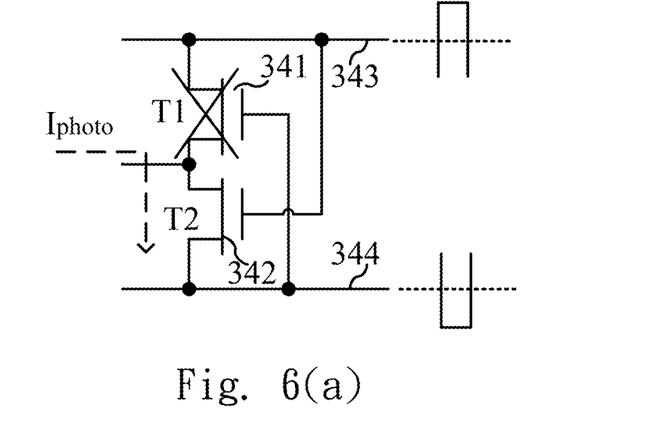
FIG. 6(a) is a circuit diagram of a first stage driving according to a first embodiment of the present invention.
Figure 6B:
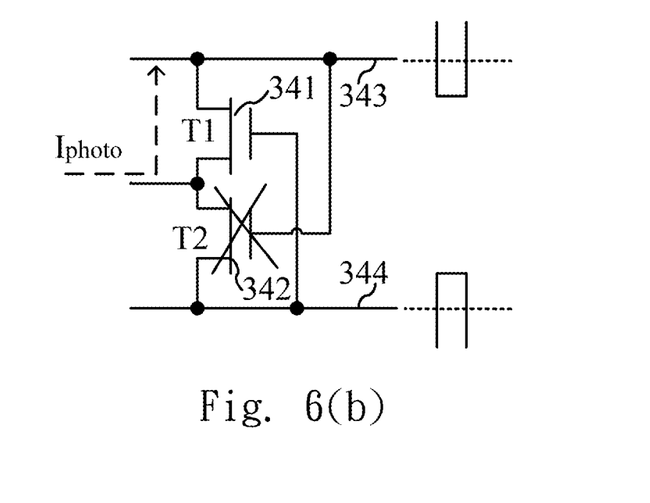
FIG. 6(b) is a circuit diagram of a second stage driving according to a first embodiment of the present invention.

In the following, referring to FIG. 4 and FIG. 6 for a description of the steps of an embedded optical induction input method according to a first embodiment of the present invention. When signals are transmitted to a switching transistor 321 from a gate line 35, a switching transistor 321 is turned on, so that a current flows into a detector transistor 322. When a user touches a touch-control panel, an induction current signal Iphoto is generated by a corresponding detector transistor 322 based on the differences of the intensities of light irradiations received, and then the signal is transferred into a conversion circuit 34. Wherein, the conversion circuit 34 is composed of two transistors. As such, the driving process is composes of two stages: firstly, in the first stage, referring to FIG. 6(a), applying two biases each of a high level voltage and a low level voltage respectively on a first bias line 343 and a second bias line 344, so that a first transistor 341 is turned off and a second transistor 342 is turned on. At this time, the second transistor 342 acts as the role of a resistor and converts the induction current signals (Iphoto) output by a light sensing circuit 32 into induction voltage signals, and then transfers that signals to a read circuit 38 through a read line 36. Subsequently, in the second stage, referring to FIG. 6(b), applying two biases each of a low level voltage and a high level voltage respectively on a first bias line 343 and a second bias line 344, so that a first transistor 341 is turned on and a second transistor 342 is turned off. At this time, the first transistor 341 acts as the role of a resistor and converts induction current signals (Iphoto) output by a light sensing circuit 32 into induction voltage signals, and then transfers those signals to a read circuit 38 through a read line 36. As such, the above-mentioned two-stage driving process is repeated continuously, so that the first transistor 341 and the second transistor 342 are used to convert the induction current signals into the induction voltage signals alternatively; thus the polarity variations of transistors 341 and 342 are utilized to detect continuously whether a touch-control-position event does indeed occur, and the polarity variations of transistors are utilized to compensate trapped charges, hereby preventing the shifting of the threshold voltage Vt of the transistors.

In addition to the first embodiment mentioned above, the present invention is further provided with other embodiments as follows by making use of two transistors as a conversion circuit.

Figure 7:
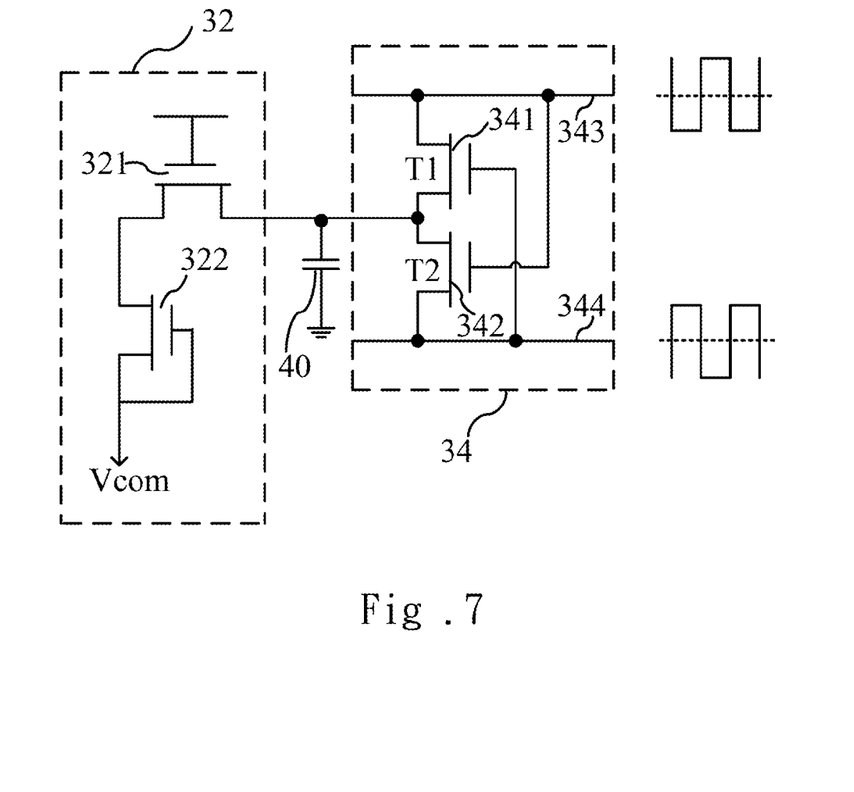
FIG. 7 is a circuit diagram of an optical induction input device according to a second embodiment of the present invention.

Subsequently, referring to FIG. 7 for an embedded optical induction input device according to a second embodiment of the present invention. In order for the induction current signals output from a light sensing circuit 32 to be more stable, an additional capacitor 40 can be added, and also connected in parallel with a conversion circuit 34 in forming a RC circuit, so that the induction voltage signals output by a conversion circuit 34 can be more stable. In this configuration, the structure of capacitor 40 can be realized by making use of the existing semiconductor array manufacturing process and equipment. The remaining structures and driving methods of the present invention are the same as those of the first embodiment, and therefore they will not be repeated here for brivity's sake.

Figure 8:
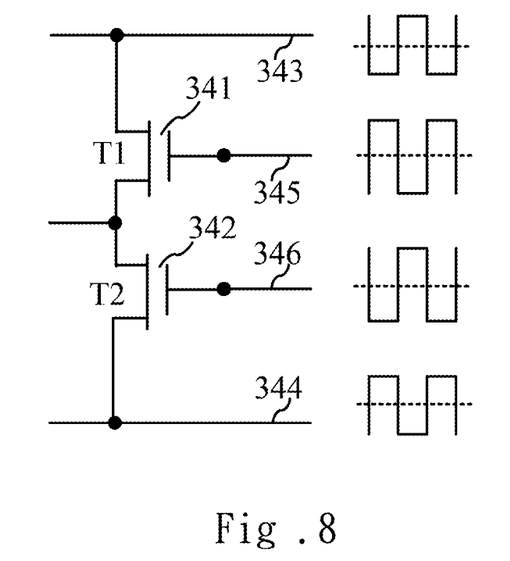
FIG. 8 is a circuit diagram of an optical induction input device according to a third embodiment of the present invention.

Since there are quite a lot of reasons and mechanisms that may cause the shifting of threshold voltages of transistors, such as the structures, materials, or manufacturing processes of different kinds of transistors. Therefore, in a third embodiment of the present invention, more voltage signals are introduced to regulate the voltages of transistors. As shown in FIG. 8, a drain of a first transistor 341 is connected to a first bias line 343, a gate of the first transistor is connected to a third bias line 345, a source of the first transistor is connected to a source of a second transistor 342, and also the sources of the first transistor 341 and the second transistor 342 are both connected to a light sensing circuit; a drain of the second transistor 342 is connected to a second bias line 344, a gate of the second transistor is connected to a fourth bias line 346. In the above structure, voltage signals of same phase but different levels are applied to the first bias line 343 and the fourth bias line 346; and the voltage signals on the second bias line 344 and the third bias line 345 are of the same phase but different levels. In the present embodiment, in the first stage (t1) of the driving process, low level voltages of different levels are applied to the first bias line 343 and the fourth bias line 346, and high level voltages of different levels are applied to the second bias line 344 and the third bias line 345, so that the first transistor 341 is turned on, and the second transistor 342 is turned off. At this time, the first transistor 341 plays the role of resistor in converting an induction current signal (Iphoto) output by the light sensing circuit 32 into an induction voltage signal. Subsequently, in the second stage (t2) of the driving process, high level voltages of different levels are applied to the first bias line 343 and the fourth bias line 346, and low level voltages of different levels are applied to the second bias line 344 and the third bias line 345, so that the first transistor 341 is turned off, and the second transistor 342 is turned on. At this time, the second transistor 342 plays the role of resistor in converting induction current signals (Iphoto) output by the light sensing circuit 32 into induction voltage signals. As such, the above-mentioned two-stage driving process is repeated continuously, so that the first transistor 341 and the second transistor 342 are used in converting the induction current signals in turn into the induction voltage signals alternatively.

Figure 9:
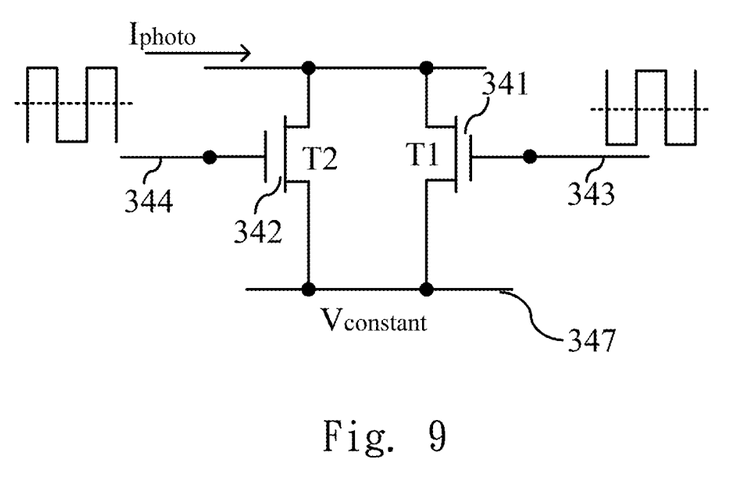
FIG. 9 is a circuit diagram of an optical induction input device according to a fourth embodiment of the present invention.

Finally referring to FIG. 9 for a fourth embodiment of the present invention. As shown in FIG. 9, in a conversion circuit 34, a gate of the first transistor 341 is connected to a first bias line 343, its drain is connected to a constant voltage source (Vconstant) 347, a source of the first transistor 341 is connected to a source of a second transistor 342, so as to receive an induced current signal; a gate of the second transistor is connected to a second bias line 344, with its drain connected to the same constant voltage source (Vconstant) 347. In this configuration, the first bias line 343 and the second bias line 344 supply voltage signals of the same period but opposite phases respectively to the first transistor 314 and the second transistor 342, so that the first transistor 314 and the second transistor 342 convert induction current signals into induction voltage signals in turn alternatively.

Summing up the above, in the application of the various embodiments of present invention, transistors are utilized to replace the resistors used in the prior art in achieving the objective of converting the induction current signals into induction voltage signals. Since the transistors utilized in these processes can be produced concurrently with the semiconductor arrays by means of the existing semiconductor array manufacturing process and equipment, such that they can be incorporated and embedded into the existing display device. Furthermore, since the device of the present invention can be produced by means of a standardized manufacturing process, thus there is no need to add another touch-control panel and the additional resistor elements, so that its cost can be reduced to the minimum, its modularized product be relatively thin and light-weight, and be able to achieve wider scope of applications.

The above detailed description of the preferred embodiment is intended to describe more clearly the characteristics and spirit of the present invention. However, the preferred embodiments disclosed above is not intended to be any restrictions to the scope of the present invention. Conversely, its purpose is to include the various changes and equivalent arrangements which are within the scope of the appended claims.

What is claimed is:

1. An embedded optical induction input device, comprising:
    a plurality of induction input units arranged in array, each of said respective induction input units includes:
        at least a light sensing circuit generating an induction current signal based on intensity of light irradiation received;
        a conversion circuit, including a first transistor and a second transistor connected to each other, said first transistor and said second transistor are connected to said light sensing circuit, and converts said induction current signal into an induction voltage signal based on the first transistor and the second transistor alternative switching in turn;
    four bias lines, namely, a first bias line, a second bias line, a third bias line, and a four bias line;
    a drain of said first transistor is connected to said first bias line;
    a gate of said first transistor is connected to said third bias lines;

a source of said first transistor is connected to a source of said second transistor;

a drain of said second transistor is connected to said second bias line; and a gate of said second transistor is connected to said fourth bias line, wherein said first bias line and said fourth bias line are used to receive voltage signals of the same phase but different levels, thus said voltage signals on said second bias line and said third bias line are of the same phase but different levels, wherein, said sources of said first transistor and said second transistor are connected to said light sensing circuit.

2. The embedded optical induction input device as claimed in claim 1, wherein said light sensing circuit includes a switching transistor and a detector transistor, said switching transistor is used to control a current flowing into said detector transistor, and said detector transistor is used to generate said induction current signal based on intensity of light irradiation received.

3. The embedded optical induction input device as claimed in claim 1, further comprising:

a readout circuit, that is connected to each of said respective induction input units via a plurality of readout lines, so that said readout circuit receives said induction voltage signal.

4. The embedded optical induction input device as claimed in claim 1, further comprising:

a capacitor, connected to said light sensing circuit, and connected in parallel with said conversion circuit.

5. The embedded optical induction input device as claimed in claim 1, wherein said first transistor and said second transistor are thin film transistors.

6. The embedded optical induction input device as claimed in claim 1, wherein:

each of said induction input units further includes a plurality of said light sensing circuits to share said conversion circuit.

7. An embedded optical induction input method, through which a first transistor and a second transistor are used to convert induction current signals generated by at least a light sensing circuit into the induction voltage signals, including the following steps:

applying a high level voltage and a low level voltage respectively to a gate of said first transistor and a gate of said second transistor, thus turning on said first transistor and turning off said second transistor, and converting said induction current signals into said induction voltage signals as an output by means of said first transistor;

applying said low level voltage and said high level voltage to said gate of said first transistor and said gate of said second transistor, thus turning off said first transistor and turning on said second transistor, and converting said induction current signals into said induction voltage signals as said output by means of said second transistor; and repeating the above-mentioned steps, converting said induction current signals generated by said light sensing circuit into said induction voltage signals in turn by means of said first transistor and said second transistor.

8. The embedded optical induction input method as claimed in claim 7, wherein said high level voltage and said low level voltage are respectively having the same period but opposite phases.

9. The embedded optical induction input method as claimed in claim 7, wherein said light sensing circuit includes a switching transistor and a detector transistor, said switching transistor controls currents flowing into said detector transistor, and said detector transistor generates induced current signals based on its intensity of light irradiation received.

10. The embedded optical induction input method as claimed in claim 7, wherein said high level voltage and said low level voltage are provided respectively to said first transistor and said second transistor as voltages having opposite phases through at least two bias lines.

11. The embedded optical induction input method as claimed in claim 7, wherein said induced voltage signals are transmitted to a readout circuit through at least a readout line in determining a touch-control-position event generating said induced current signals.

12. An embedded optical induction input device, comprising:

a plurality of induction input units arranged in array, each of said respective induction input units includes:

at least a light sensing circuit; and a conversion circuit, including a first transistor and a second transistor, a source of said first transistor is connected to a source of said second transistor, and said source of said first transistor and said source of said second transistor are both connected to said light sensing circuit, a drain of said first transistor is connected to a first bias line, a gate of said first transistor is connected to a third bias line, a drain of said second transistor is connected to a second bias line, a gate of said first transistor is connected to a fourth bias line.

13. The embedded optical induction input device as claimed in claim 12, wherein said first bias line is connected to said fourth bias line, and said second bias line is connected to said third bias line.

14. The embedded optical induction input device as claimed in claim 12, wherein said first bias line is connected to said second bias line.

15. The embedded optical induction input device as claimed in claim 12, wherein said light sensing circuit includes a switching transistor and a detector transistor, said switching transistor controls currents flowing into said detector transistor, and said detector transistor generates induced current signals based on intensity of light irradiation received.

16. An embedded optical induction input device, comprising:

a plurality of induction input units arranged in array, each of said respective induction input units includes:

at least a light sensing circuit generating an induction current signal based on intensity of light irradiation received;

a conversion circuit, including a first transistor and a second transistor connected to each other, said first transistor and said second transistor are connected to said light sensing circuit, and converts said induction current signal into an induction voltage signal based on the first transistor and the second transistor alternative switching in turn;

two bias lines, connected respectively to said first transistor and said second transistor to provide voltages of opposite phases to said first transistor and said second transistor; and said two bias lines are a first bias line and a second bias line, so that a gate of said first transistor is connected to said second bias line, a drain of said first transistor is connected to said first bias line, and a source of said first transistor is connected to a source of said second transistor, a gate of said second transistor is connected to said first bias line, a drain of said second transistor is connected to said second bias line, wherein, said source of said first transistor and said source of said second transistor are connected to said light sensing circuit.

17. An embedded optical induction input device, comprising:
- a plurality of induction input units arranged in array, each of said respective induction input units includes:
- at least a light sensing circuit generating an induction current signal based on intensity of light irradiation received; and
- a conversion circuit, including a first transistor and a second transistor connected to each other, said first transistor and said second transistor are connected to said light sensing circuit, and converts said induction current signal into an induction voltage signal based on the first transistor and the second transistor alternative switching in turn;
- two bias lines, connected respectively to said first transistor and said second transistor to provide voltages of opposite phases to said first transistor and said second transistor; and
- said two bias lines are a first bias line and a second bias line, a gate of said first transistor is connected to said first bias line, a drain of said first transistor is connected to a constant voltage source, and a source of said first transistor is connected to said source of said second transistor, said gate of said second transistor is connected to said second bias line, a drain of said second transistor is connected to said constant voltage source, wherein, said sources of said first transistor and said second transistor are connected to said light sensing circuit.

* * * * *